United States Patent Office 3,372,118
Patented Mar. 5, 1968

3,372,118
PROCESS FOR PREPARING BASIC ALKYL PHENOLIC COMPOSITIONS
Rudolph J. Rense, Gates Mills, Ohio, assignor to The Lubrizol Corporation, Wickliffe, Ohio, a corporation of Ohio
No Drawing. Filed Dec. 7, 1965, Ser. No. 512,240
6 Claims. (Cl. 252—42.7)

ABSTRACT OF THE DISCLOSURE

Overbased derivatives of mixtures of alkylated phenols and polar compounds such as amines, amine-aldehyde condensation products, esters, alcohols and the like are prepared by mixing a metal base such as barium oxide or hydroxide with an oil solution of the phenol, removing most of the water in the mixture, adding the polar compound at about 125-175° C. and carbonating. This method avoids foaming and decomposition of the ingredients of the reaction mass. The products are useful as lubricant and fuel additives.

---

This invention relates to methods for preparing additive compositions for lubricants and fuels, and more particularly to a new and improved method for the preparation of basic metal derivatives of mixtures of phenols and certain polar organic compounds.

U.S. Patents 2,971,014 and 2,989,463 are directed to lubricant compositions containing, as a detergent or "antisquawk" additive for automatic transmissions, the reaction product of a basic metal compound with an alkylated phenol and an oil-soluble, non-tautomeric polar compound which is preferably an ester, alcohol, or amine. Other polar compounds, such as sulfoxides and condensation products of amines with lower aliphatic aldehydes, may also be used. These metal compositions are also useful as smoke-suppressing additives for diesel fuel as disclosed and claimed in copending application Ser. No. 357,787, filed Apr. 6, 1964.

As described in the aforementioned patents, the metal-containing compositions are prepared by first forming a mixture of the polar compound, the phenol and mineral oil, and then heating this mixture and adding the metal base. The initial mixture ordinarily contains a small amount of water, which aids in fluidizing the metal base; however, the presence of more than trace amounts of water is intolerable during the heating stages of the reaction. If too much water is present, rapid steam evolution and foaming may occur as the metal base is added, and when the polar compound is an amine-aldehyde condensation product, it may decompose when exposed to water at high temperatures.

A possible alternate method of operation involves forming an oil suspension of the metal base at a relatively low temperature, adding the organic ingredients and water and then heating. Although this alleviates the problem of steam evolution, decomposition of the amine-aldehyde condensation product is still possible. Furthermore, it is almost impossible to prepare a uniform slurry of metal base in oil under these conditions because of caking and settling of the solid base.

A principal object of the present invention, therefore, is to provide an improved method for the preparation of metal derivatives of combinations of alkylphenols and polar compounds such as amines, esters, and amine-aldehyde condensation products.

A further object is to provide a method by which such compounds may be prepared by a convenient method in a relatively short time.

A further object is to prepare such compounds by a method which avoids problems of steam evolution and foaming.

Still another object is to provide a method for preparing such compounds whereby a uniform reaction mixture is formed and caking and settling of solids is avoided.

Other objects will in part be obvious and will in part appear hereinafter.

It has now been found that the problems described above can be avoided by first combining the oil, metal base, alkylphenol and water, removing excess water, and thereafter introducing the polar compound and heating. By this method, steaming and decomposition are avoided since substantially all the excess water is driven off before the polar compound is present and thus before it can react with the metal base. Moreover, the presence of the phenol in the oil suspension of the metal base retards caking and aids in the formation of a uniform suspension.

Accordingly, the present invention is directed to a method which comprises:

(A) Preparing an oil suspension of an alkyl phenolic compound, a basic inorganic metal compound and water, and removing water from said suspension until the total water content is at most about 0.2–1.5% by weight thereof;

(B) Adding to said suspension, at a temperature of about 125–175° C., an oil-soluble, metal-free, non-tautomeric neutral or basic organic polar compound having at least about 12 aliphatic carbon atoms, at least about one equivalent of said inorganic metal compound being present per equivalent of alkyl phenolic compound and polar compound combined; and (C) Reacting the product thus produced with an acidic gas having an ionization constant greater than that of said phenolic compound until the titratable basicity of the mixture has been substantially reduced.

As used herein, the term "alkylated phenolic compound" includes all aromatic compounds having a single phenolic group and at least one alkyl substituent containing at least about 3 carbon atoms. Suitable alkyl substituents include t-butyl, isoheptyl, diisobutyl, n-decyl, polyisobutenyl (derived from polyisobutylene fractions of various molecular weights) and the like, and also cycloaliphatic substituents. Other radicals such as halogen, nitro, alkoxy, and the like, may also be present. Also included are aldehyde condensation products of the alkylated phenolic compounds described above, especially condensation products with lower aldehydes and particularly formaldehyde.

Compounds chiefly contemplated by the term "basic inorganic metal compounds" include the oxides and hydroxides of the alkali and alkaline earth metals, especially barium. If the oxides are used, it is necessary to introduce sufficient water to convert them at least partially to the hydroxides before the reaction takes place. Hydrates of these basic compounds may be used if desired; examples of such hydrates are barium hydroxide monohydrate and pentahydrate. However, if hydrates are used, the total water contained in the reaction mixture, including both free water and water of hydration, must not exceed about 0.2–1.5% of the total reaction mixture. Basic salts such as the sulfides, carbonates, bicarbonates, alkoxides, and the like may also be used but are somewhat less suitable than the oxides and hydroxides.

As polar compounds there may be mentioned such materials as esters (especially carboxylic acid esters), amides, amines, alcohols, sulfoxides and condensation products of amines with lower aliphatic aldehydes or epoxides. These compounds should contain at least 12 aliphatic carbon atoms to promote oil solubility. Typical examples of suitable compounds are glyceryl oleate and stearate, oleyl alcohol, tridecyl alcohol, N-octadecylpropylenediamine, sperm oil and the like. Particularly preferred are compounds formed by the reaction of an aliphatic amine such as N-octadecylpropylenediamine with an aliphatic aldehyde having no more than about six carbon atoms, preferably formaldehyde. Such addition products are ordinarily prepared by reacting the amine with the aldehyde at a temperature of about 110–160° C. This reaction may be carried out in the presence of a solvent and/or a catalyst or promoter such as lime; however, solvents and catalysts are often not necessary. The equivalent weight ratio of polar compound to phenolic compound may vary from about 1:10 to 10:1, and preferably is between about 1:5 and 5:1.

By the term "acidic gas" is meant one which produces an acid when dissolved in water. Suitable gases include, for example, carbon dioxide, sulfur dioxide, sulfur trioxide, hydrogen sulfide and the like. Carbon dioxide, because of its low cost and particular utility in the process, is preferred.

According to the present invention, a mineral oil suspension containing the alkylphenol and the metal base, preferably barium oxide or barium hydroxide, is first prepared. In general, the amount of metal base used is at least about 1 equivalent and preferably between about 1.5 and 15 equivalents per equivalent of phenolic compound. In very few instances should the equivalent ratio of metal base to phenol exceed 25:1. The addition of the metal base to the phenol-oil mixture is ordinarily effected at somewhat above room temperature, preferably about 85–100° C. Apparently the phenol acts as a dispersant or the like, promoting formation of a uniform suspension of the metal base.

The suspension thus formed is treated to remove the bulk of the water present; such removal may be accomplished by heating, by vacuum evaporation, by blowing with an inert gas such as nitrogen, or by combinations of these techniques. It is usually most convenient to evaporate the water by heating the mixture to about 125–175° C., preferably about 140–160° C. While it is necessary to remove most of the water at this stage for the reasons given hereinabove, the presence of a small amount of water is highly desirable since it promotes the reactions which take place in the later stages of the process. In general, no more than about 0.2–1.5% of water by weight should remain in the reaction mixture.

After the water content has been reduced, the polar compound is added. The rate of addition is not critical but should not be so rapid as to cause excessively vigorous reaction. Generally, an addition time of about 30 minutes is suitable.

After the polar compound has been added and thoroughly mixed with the phenolic compound-metal base suspension, the product is blown with an acidic gas such as carbon dioxide at a temperature of about 125–175° C. The amount of acidic gas which is used will depend upon the desired basicity of the final product. Thus, if a highly basic product is desired, only a small amount of acidic gas will be used. Ordinarily, however, a less basic product is desired and therefore more gas will be used. Particularly preferred are products which are substantially neutral, i.e., those in which the neutralization number is less than about 10. For the preparation of these neutral products, it is usually necessary to use a rather large amount of acidic gas, often more than 25% by weight of the amount of basic metal compound being treated. Generally, more than the theoretical amount of gas must be used to achieve the desired degree of basicity.

After treatment with the acidic gas, the product is filtered, with the addition of a suitable filter aid material if desired.

The process of this invention is illustrated by the following examples. All parts are by weight.

Example 1

A reaction vessel is charged with 1200 parts of mineral oil, 633 parts of N-octadecylpropylenediamine and 20 parts of lime. The mixture is heated to 93° C. and 472 parts of 37% formaldehyde solution is added over a 2-hour period. The reaction mixture is stirred for one hour at 92–93° C., and is then heated to 150°–160° C. for an additional 6 hours.

In a separate reaction vessel, 186 parts of mineral oil and 74 parts of heptylphenol are heated to 93° C. and 290 parts of barium hydroxide monohydrate is added over 4 hours; a uniform suspension is formed. The mixture is heated to 150° C. and 192 parts of the amine-formaldehyde product prepared as described above is introduced over a 30-minute period. The ingredients are mixed for 10 minutes at 150° C., and the reaction mixture is then blown with carbon dioxide for 5½ hours at 150° C. An additional 79 parts of mineral oil is added and the mixture is heated for an additional 30 minutes, after which 25 parts of filter aid is added and the oil solution is filtered. The product is an oil solution containing 23.4% barium and 39.7% barium sulfate ash and having a neutralization number of 0.5. No substantial amount of foaming or steam evolution is observed during the reaction.

Example 2

To a mixture of 490 parts of mineral oil, 1000 parts of N-octadecylpropylenediamine, 32 parts of lime and 143 parts of water, at a temperature of 35–40° C., is added 303 parts of paraformaldehyde. The mixture is heated to 100–105° C. for one hour and then to 150° C. for 3 hours.

In a separate vessel, a mixture of 197 parts of mineral oil and 119 parts of heptylphenol is heated to 98° C. and 465 parts of barium hydroxide monohydrate is added. The solution is heated at 100–105° C. for about 3 hours, and 149 parts of the amine-formaldehyde condensation product is added at 150° C. over 3 hours. Carbon dioxide is then passed into the solution for slightly more than 7 hours at 150° C. The product, after filtration, contains 30% barium and 51% barium sulfate ash and has a neutralization number of 0.5.

Example 3

A barium-containing composition is prepared by heating a mixture of 124 grams of diisobutylphenol, 766 grams of mineral oil, 306 grams of barium oxide and 146 grams of water to 150° C. to remove excess water, adding 174 grams of N-octadecylpropylenediamine, and heating at 150° C. for one hour, and blowing with carbon dioxide at 150° C. until the mixture is substantially neutral.

Example 4

A barium-containing composition is prepared from 423 grams of sperm oil, 123 grams of heptylphenol, 1214 grams of mineral oil, 612 grams of barium oxide and 452 grams of water, following the procedure of Example 3.

Example 5

The procedure of Example 3 is employed for the preparation of a metal-containing composition from 268 grams of oleyl alcohol, 90 grams of t-butylphenol, 1114 grams of mineral oil, 306 grams of barium oxide and 190 grams of water.

Example 6

A sulfoxide is prepared by reacting 47.5 parts of thionyl chloride with 100 parts of polyisobutylene (750 average molecular weight) at 200–220° C. for 4½ hours. This sulfoxide (787 grams) is reacted with a mixture prepared from 124 grams of diisobutylphenol, 550 grams of mineral oil, 306 grams of barium oxide and 200 grams of water, according to the procedure of Example 3, and the product is blown with carbon dioxide until it is substantially neutral and filtered.

What is claimed is:
1. A method for the preparation of a basic metal composition which comprises the steps of:
(A) preparing an oil suspension of an alkyl phenolic compound selected from the group consisting of alkyl phenols having at least one alkyl substituent containing at least 3 carbon atoms and aldehyde condensation products thereof, a basic inorganic metal compound and water, and removing water from said suspension until the total water content is about 0.2–1.5% by weight thereof;

(B) adding to said suspension, at a temperature of about 125–175° C., an oil-soluble condensation product of an aliphatic amine with an aliphatic aldehyde having no more than about 6 carbon atoms, at least about one equivalent of said inorganic metal compound being present per equivalent of alkyl phenolic compound and amine-aldehyde condensation product combined; and (C) reacting the product thus produced with an acidic gas having an ionization constant greater than that of said phenolic compound until the titratable basicity of the mixture has been substantially reduced.

2. The method of claim 1 wherein water is removed by heating said suspension to about 125–175° C.

3. The method of claim 2 wherein the acidic gas is carbon dioxide.

4. The method of claim 3 wherein the final product has a neutralization number less than about 10.

5. The method of claim 1 wherein the phenolic compound is heptylphenol, the metal compound is barium oxide or hydroxide, the polar compound is a condensation product of N-octadecylpropylenediamine with formaldehyde, the acidic gas is carbon dioxide, the water is removed by heating said suspension to about 125–175° C., and the final product has a neutralization number of less than about 10.

6. The method of claim 5 wherein the water is removed by heating the suspension to about 140–160° C.

References Cited
UNITED STATES PATENTS 2,971,014    2/1961    Mastin    252—42.7 X
2,989,463    6/1961    Mastin    252—42.7 X DANIEL E. WYMAN, *Primary Examiner.*

PATRICK P. GARVIN, *Examiner.*